(12) United States Patent
Poletto et al.

(10) Patent No.: US 6,741,845 B1
(45) Date of Patent: May 25, 2004

(54) WAVE-SHAPER DEVICE

(75) Inventors: Vanni Poletto, Alessandria (IT); Alberto Poma, Pavia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/602,354

(22) Filed: Jun. 23, 2000

(51) Int. Cl.[7] ................................................. H04B 7/00
(52) U.S. Cl. ..................... 455/238.1; 455/264; 280/735
(58) Field of Search .............................. 331/74, 34, 76, 331/53, 51; 327/131; 332/117; 340/435, 436, 438; 280/727, 728.1, 734, 735; 455/127, 68–70, 85, 86, 208, 257, 258, 264, 95, 99, 238.1, 345

(56) References Cited

U.S. PATENT DOCUMENTS

| | | | |
|---|---|---|---|
| 3,728,614 A | * | 4/1973 | Hearn .......................... 324/301 |
| 4,563,548 A | * | 1/1986 | Misherghi et al. ...... 379/357.04 |
| 4,704,737 A | * | 11/1987 | Estrick et al. ............. 455/226.1 |
| 4,714,928 A | * | 12/1987 | Schmitt ....................... 342/174 |
| 4,972,134 A | * | 11/1990 | Getz et al. .................. 318/817 |
| 5,184,131 A | * | 2/1993 | Ikeda .......................... 341/165 |
| 5,274,380 A | * | 12/1993 | Yatsuka et al. ............... 342/70 |
| 5,506,585 A | * | 4/1996 | Shiratori ....................... 342/71 |
| 6,201,718 B1 | * | 3/2001 | Yoshizumi et al. ........... 363/60 |
| 6,535,115 B1 | * | 3/2003 | Barth et al. ................. 340/436 |

* cited by examiner

*Primary Examiner*—Sinh Tran
*Assistant Examiner*—Eliseo Ramos-Feliciano
(74) *Attorney, Agent, or Firm*—Lisa K. Jorgenson; Robert Iannucci; Seed IP Law Group PLLC (57) ABSTRACT

A wave-shaper device having an output terminal for providing a first periodic analog signal with a first frequency, the wave-shaper device including an oscillator having an output terminal for providing a second periodic analog signal with a second frequency which is multiple with an even factor of the first frequency, and means for obtaining the first analog signal from the second analog signal.

16 Claims, 5 Drawing Sheets

WAVE-SHAPER DEVICE

TECHNICAL FIELD

The present invention relates to a wave-shaper device.

BACKGROUND OF THE INVENTION

Wave-shaper devices are commonly used in several applications, for example in a transmitter of a control system for air-bags. A wave-shaper device outputs a periodic analog signal, typically a pseudo-sinusoidal voltage; the analog signal is used to drive a power device (such as a current modulator in the aforementioned transmitter), which is coupled to the wave-shaper device.

The power device is subject in use to a noise, which is propagated to the wave-shaper device (coupled to the power device) and therefore affects its operation. For example, the noise may alter the value of reference quantities (voltages or currents) used by the wave-shaper device, thereby modifying the frequency of the analog signal.

The solutions known in the art for preventing this problem employ extremely complex and expensive circuitry. Moreover, filtering capacitors with a high capacitance are also generally used; however, these components increase the cost and size of the whole system in which the wave-shaper device is included.

SUMMARY OF THE INVENTION

An embodiment of the present invention is a wave-shaper device having an output terminal for providing a first periodic analog signal with a first frequency, the wave-shaper device including an oscillator having an output terminal for providing a second periodic analog signal with a second frequency which is multiple with an even factor of the first frequency, and means for obtaining the first analog signal from the second analog signal.

Other embodiments of the present invention provide a transmitter comprising this wave-shaper device, a control system for air-bags comprising the transmitter, and a corresponding method of generating a periodic analog signal.

BRIEF DESCRIPTION OF THE DRAWINGS

Further features and the advantages of the wave-shaper device according to the present invention will be made clear by the following description of a preferred embodiment thereof, given purely by way of a non-restrictive indication, with reference to the attached figures, in which.

DETAILED DESCRIPTION OF THE INVENTION

Figure 1:
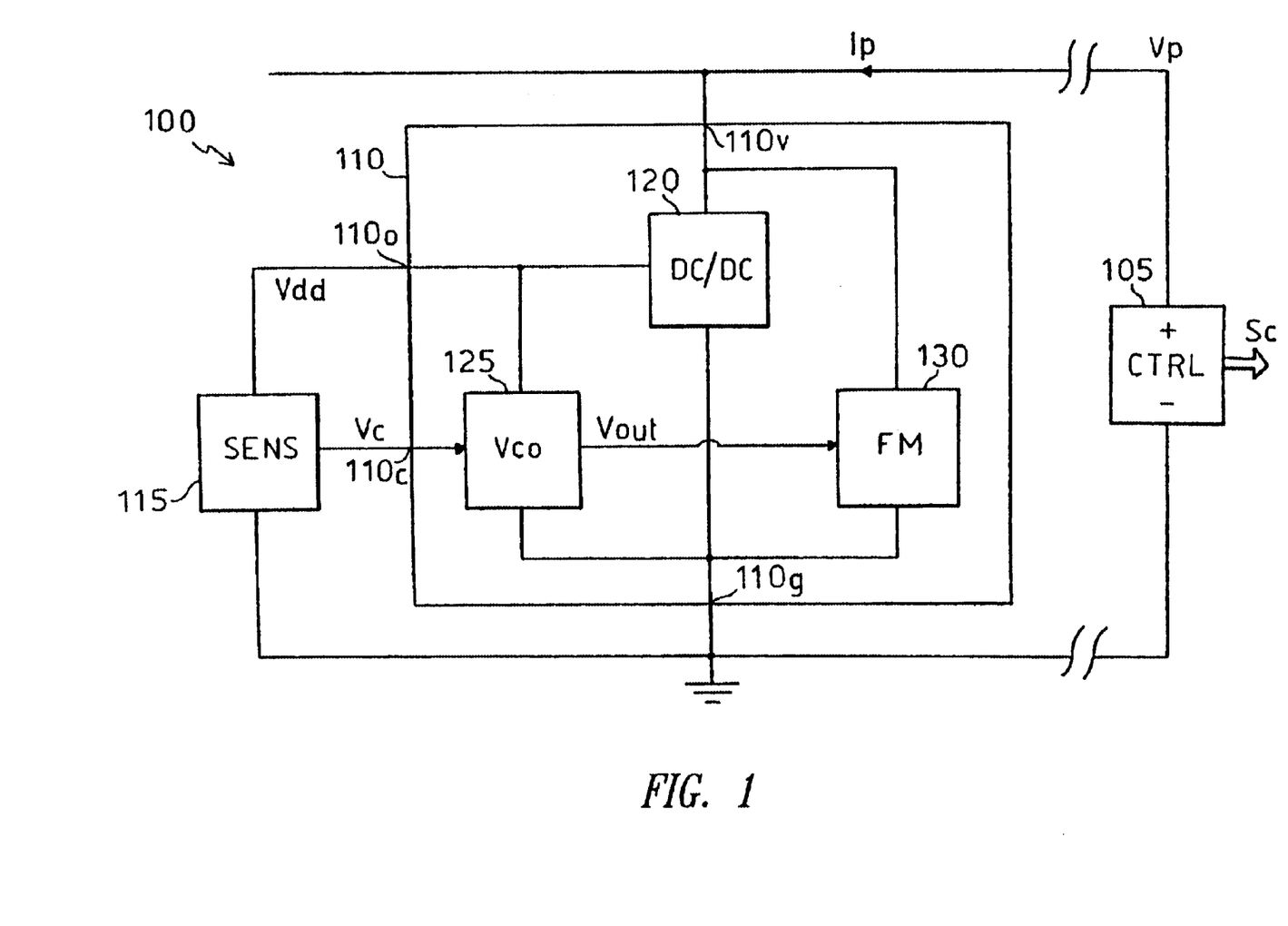
FIG. 1 shows a control system in which a wave-shaper device of the invention can be used.

With reference in particular to FIG. 1, it is depicted a control system 100 for one or more air-bags (not shown in the figure). The control system 100 includes a trigger box (CTRL) 105 having a negative supply terminal (−) which defines a reference voltage (or ground), and a positive supply terminal (+) which provides a power supply voltage Vp (relative to ground); the trigger box 105 outputs control signals for the air-bags, denoted as a whole with Sc.

A transmitter 110 is coupled to the trigger box 105. The transmitter 110 has a reference terminal 110g, a supply terminal 110v, a control terminal 110c and an output terminal 110o; the reference terminal 110g and the supply terminal 110v are connected (by means of a coaxial cable) to the negative terminal and to the positive terminal of the trigger box 105, respectively. An acceleration sensor (SENS) 115 is associated with the transmitter 110. The sensor 115 has a reference terminal connected to the reference terminal 110g, a supply terminal connected to the output terminal 110o, and an output terminal connected to the control terminal 110c.

The transmitter 110 includes a voltage regulator (DC/DC) 120 which obtains a regulated supply voltage Vdd (for example 5V) from the power supply voltage Vp. The regulated supply voltage Vdd is applied to the output terminal 110o and then to the sensor 115; the regulated supply voltage Vdd also supplies a Voltage Controlled Oscillator (VCO) 125. The sensor 115 outputs a control voltage Vc (from 0V to Vdd) function of the (positive or negative) acceleration detected by the sensor 115. The control voltage Vc is applied to the control terminal 110c and then to the VCO 125; as a consequence, the VCO 125 generates a periodic analog signal Vout (having a trapezoidal shape) which is provided to a frequency modulator (FM) 130. The modulator 130, which is supplied by the power supply voltage Vp, modulates a current Ip absorbed by the transmitter 110 according to the analog signal Vout. The trigger box 105 detects the modulated current Ip and consequently controls the air-bags (by means of the signals Sc).

Likewise considerations apply if the regulated supply voltage and the control voltage have different values, if the control system has a different structure (for example the trigger box is connected to the transmitter by means of further leads), if the VCO drives a different unit (for example a pulse width modulator), if the transmitter is used in a different application, such as for controlling an anti-breaking system (ABS), if the VCO is used in a different system (for example in a radio transmitter); alternatively, the VCO outputs a different signal (such as a signal with a triangular or other pseudo-sinusoidal shapes) or the system includes a device which outputs a signal with a fixed frequency. More generally, the present invention is directed to any wave-shaper device having an output terminal for providing a periodic analog signal (that is a signal variable in a continuous manner, opposite to a digital signal).

Figure 2:
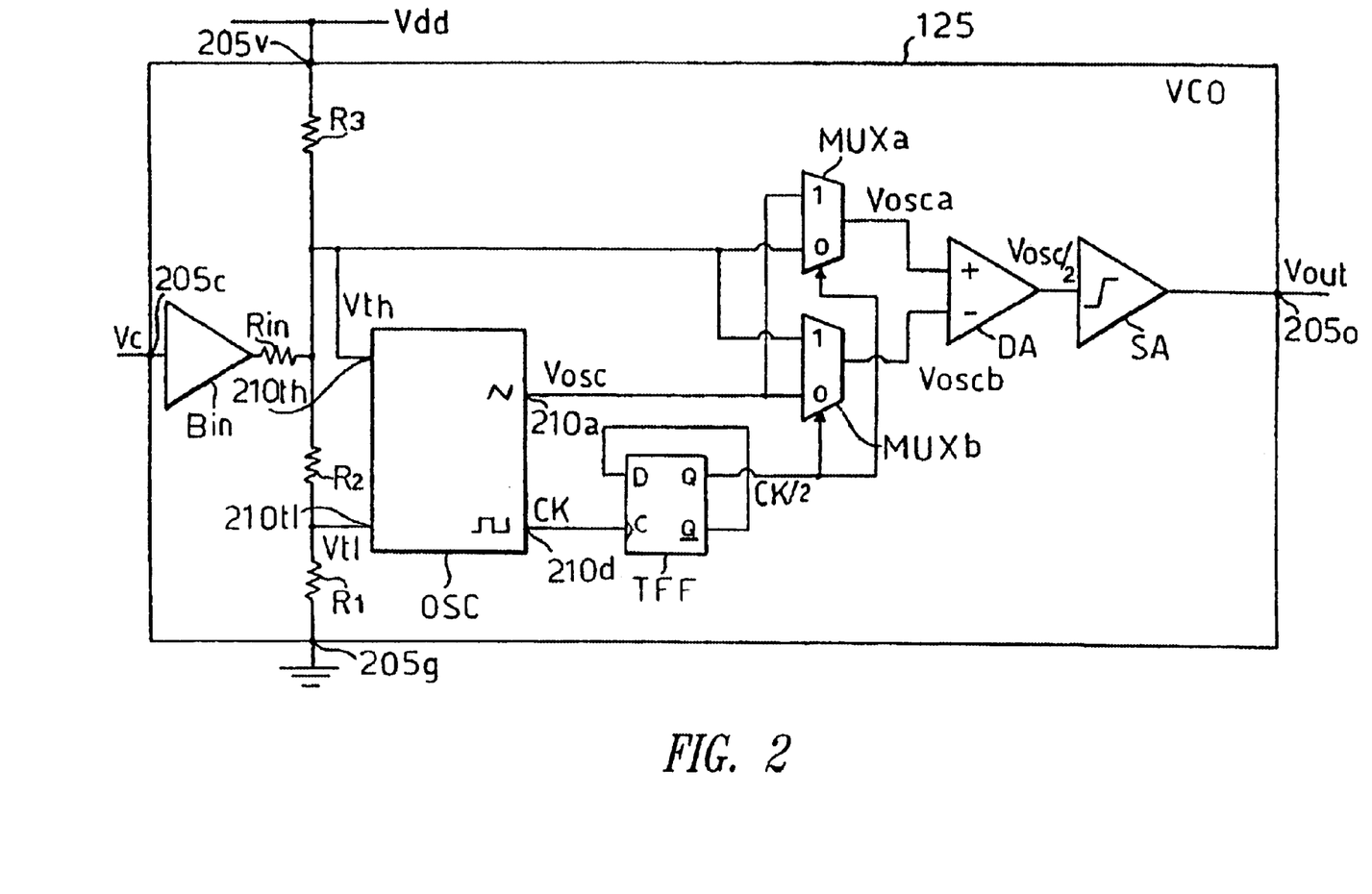
FIG. 2 is a schematic block diagram of a wave-shaper device according to an embodiment of the present invention.

Considering now FIG. 2, the VCO 125 has a reference terminal 205g (connected to ground), a supply terminal 205v (which receives the regulated supply voltage Vdd), a control terminal 205c (which receives the control voltage Vc), and an output terminal 205o (which supplies the analog signal Vout).

Three resistors R1, R2 and R3 are connected in series between the reference terminal 205g and the supply terminal 205v. An input buffer Bin in series with a further resistor Rin is connected between the control terminal 205c and a node common to the resistors R2,R3.

The VCO 125 includes an oscillator OSC having two input terminals 210tl,210th and two output terminals 210a, 210d. The input terminal 210tl is connected to a node common to the resistors R1,R2 (for receiving a low threshold voltage Vtl), while the input terminal 210th is connected to the node common to the resistors R2,R3 (for receiving a high threshold voltage Vth). The output terminal 210*a* provides a periodic analog signal Vosc, while the output terminal 210*d* provides a periodic digital signal CK.

A toggle flip-flop TFF is formed by a D-flip-flop having a data input terminal (D), a clock input terminal (C), a main output terminal (Q), and a negated output terminal (Q̄), wherein the negated output terminal Q̄ is directly connected to the data input terminal D. The clock input terminal C receives the digital signal CK, and the main output terminal Q provides a further digital signal Ck/2.

The VCO 125 includes two multiplexers MUXa and MUXb, each one controlled by the digital signal Ck/2. The multiplexer MUXa has a first input terminal (0) which receives the high threshold value Vth and a second input terminal (1) which receives the analog signal Vosc. Conversely, the multiplexer MUXb has a first input terminal (0) which receives the analog signal Vosc and a second input terminal (1) which receives the high threshold value Vth.

An analog signal Voscb output by the multiplexer MUXa and an analog signal Voscb output by the multiplexer MUXb are applied to a non-inverting input terminal (+) and to an inverting input terminal (−), respectively, of a differential amplifier DA. The differential amplifier DA provides an analog signal Vosc/2, which is supplied to a saturation amplifier SA. The saturation amplifier generates the analog signal Vout (which is applied to the output terminal 205*o*).

Figure 3A:
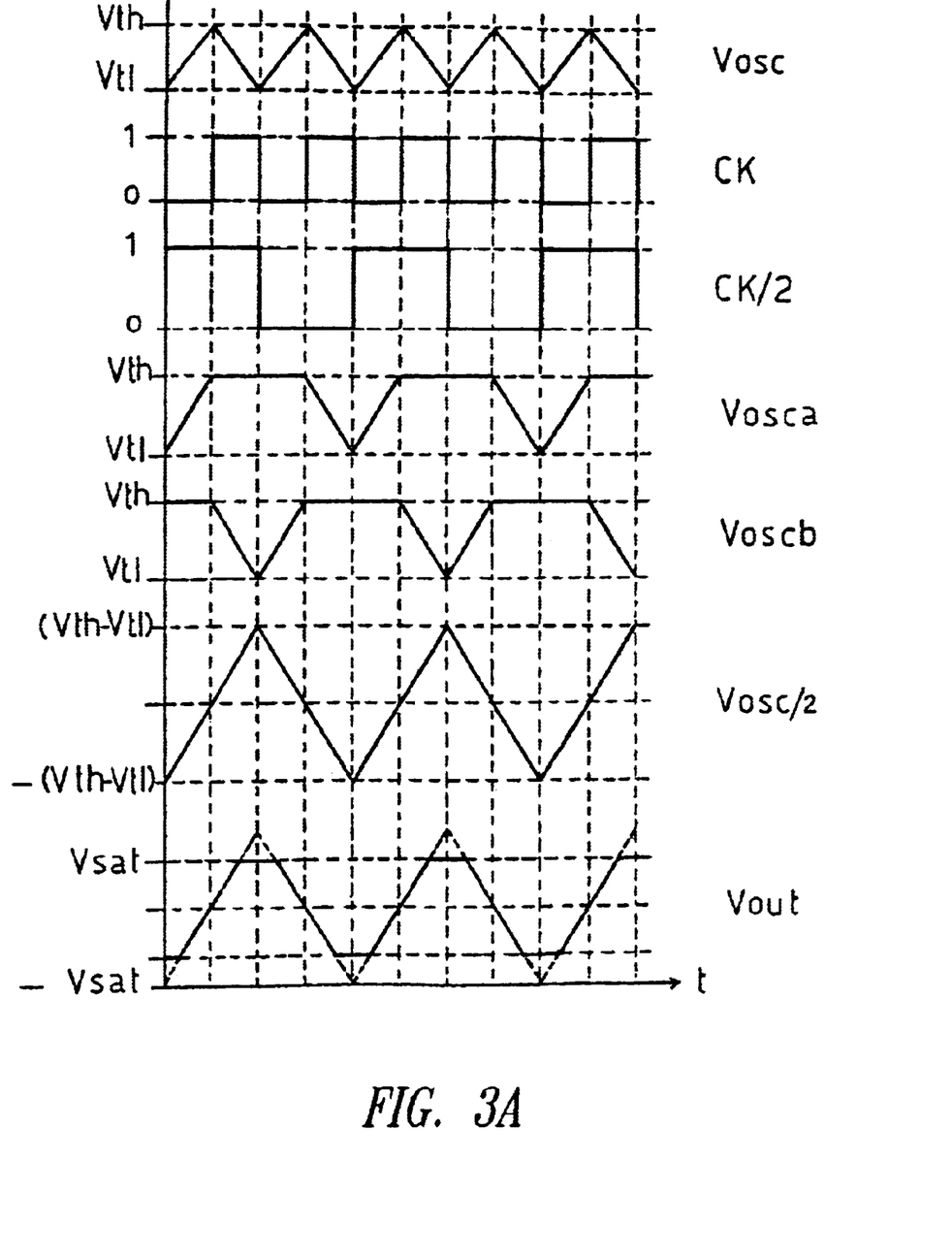
FIG. 3a depicts, in a qualitative time graph, the variation of some signals of the wave-shaper device.

In order to explain the operation of the VCO 125, reference is made to the qualitative time graph of FIG. 3*a* which shows the variation, with time (t), of the signals Vosc, CK, Ck/2, Vosca, Voscb, Vosc/2 and Vout.

The low threshold voltage Vtl and the high threshold voltage Vth are a function of the regulated supply voltage Vdd and of the control voltage Vc. Denoting the value of the electrical quantities in the following with the same symbols used to identify the corresponding components in the figures, the high threshold voltage Vth is equal to $$Vth = Vdd \frac{Rin // (R1 + R2)}{Rin // (R1 + R2) + R3} + Vc \frac{(R1 + R2) // 3}{(R1 + R2) // R3 + Rin}$$

and the low threshold voltage Vtl is equal to $$Vtl = Vth \frac{R1}{R1 + R2}$$

The analog signal Vosc has a triangular shape, variable between the low threshold voltage Vtl and the high threshold voltage Vth; therefore, as explained in detail in the following, the analog signal Vosc has a frequency f which is a function of the difference between the threshold voltages Vth and Vtl. The digital signal CK has a square shape, taking a logic value 0 (0V) or a logic value 1 (Vdd); the digital signal CK has the same frequency f of the analog signal Vosc.

The flip-flop TFF operates as a frequency divider, so that the digital signal Ck/2 has a frequency f/2 which is a half of the frequency f of the digital signal CK. Particularly, the digital signal Ck/2 switches between the logic value 0 and the logic value 1 at every leading edge of the digital signal CK which is applied to the clock input terminal C.

When the digital signal Ck/2 has the logic value 0, the multiplexer MUXa transfers the high threshold voltage Vth and the multiplexer MUXb transfers the analog signal Vosc to the respective output terminals; conversely, when the digital signal Ck/2 has he logic value 1, the multiplexer MUXa transfers the analog signal Vosc and the multiplexer MUXb transfers the high threshold voltage Vth to the respective output terminals. As a consequence, the signal Vosca and the signal Voscb have the shape depicted in the figure.

The analog signal Vosc/2 is obtained by subtracting the analog signal Voscb from the analog signal Vosca; therefore, the analog signal Vosc/2 has a triangular shape variable between a threshold voltage −(Vth−Vtl) and a threshold voltage (Vth−Vtl), and a frequency equal to f/2. The saturation amplifier has a low saturation voltage −Vsat higher than the threshold voltage −(Vth−Vtl) and a high saturation voltage Vsat lower than the threshold voltage (Vth−Vtl); the analog signal Vosc/2 is then clamped by the saturation amplifier and the analog signal Vout has a trapezoidal shape variable between the low saturation voltage −Vsat and the high saturation voltage Vsat, and a frequency equal to f/2 (that is a half the frequency f of the analog signal Vosc provided by the oscillator OSC).

Likewise considerations apply if the frequency of the oscillator is controlled in a different manner, if the analog signal Vosc has a frequency which is fourth time, sixth time, or more generally multiple with an even factor of the frequency of the analog signal Vout, if the analog signal Vout is obtained from the analog signal Vosc by means of a combinatory circuit or other equivalent means, and so on.

The solution of the present invention drastically reduces the effects of the noise on the analog signal output by the wave-shaper device. Particularly, this allows the frequency of the output signal to be controlled with a very high precision.

Figure 3B:
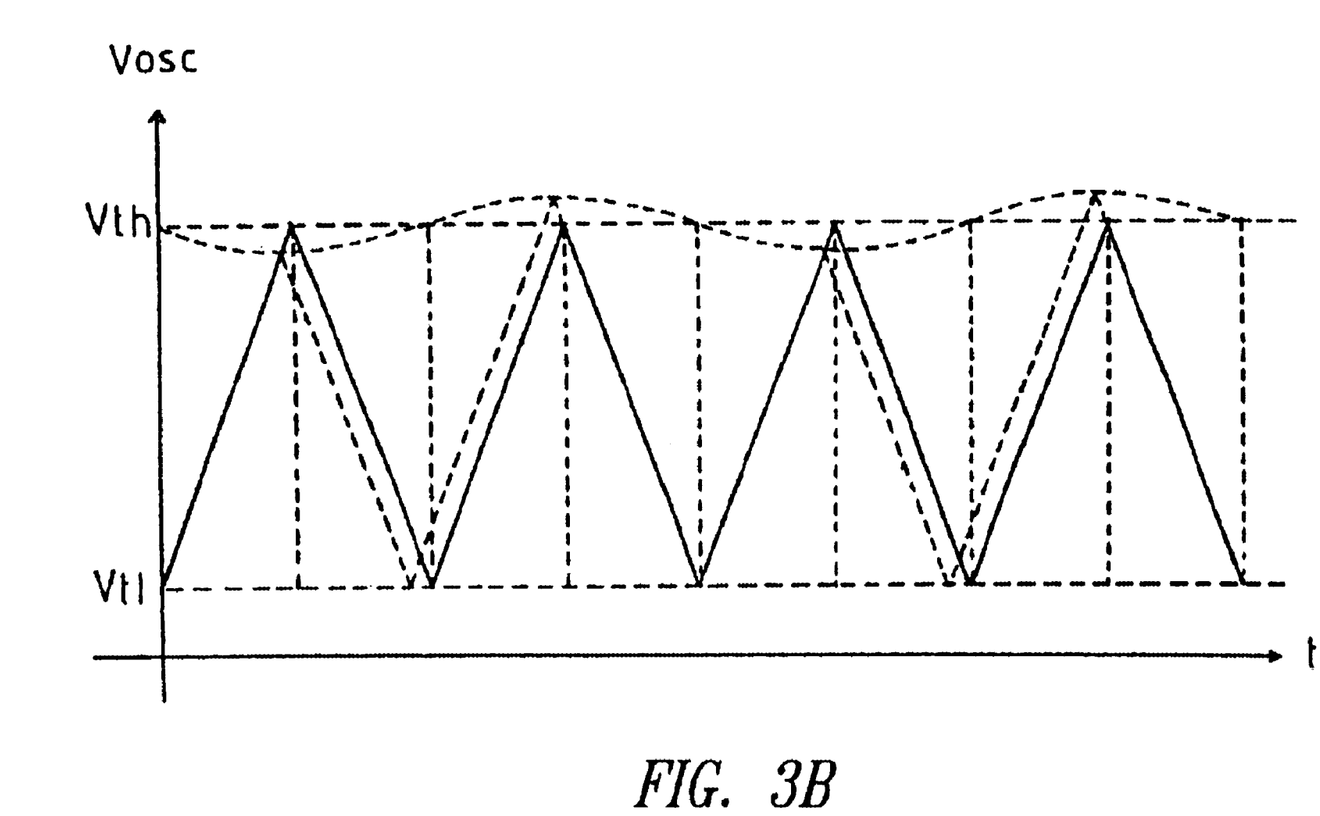
FIG. 3b shows the modification of a signal in the presence of a noise.

In fact, any noise introduced by the frequency modulator coupled to the VCO has a frequency equal to the frequency f/2 of the analog signal Vout, which is a half of the frequency f of the oscillator. As shown in FIG. 3*b*, let us consider that this noise causes an oscillation (with the frequency f/2) of the high threshold voltage Vth (likewise considerations apply to any other control parameter of the oscillator). This oscillation modifies the wave-shape of the analog signal Vosc, as depicted in dashed line in the figure; however, the oscillation does not alter a mean value of the frequency of the analog signal Vosc, and then of the analog signal Vout. In other words, the noise is sampled in a synchronous manner with a frequency that is twice the frequency of the noise, so that the sampled noise has a mean value equal to zero.

Figure 4:
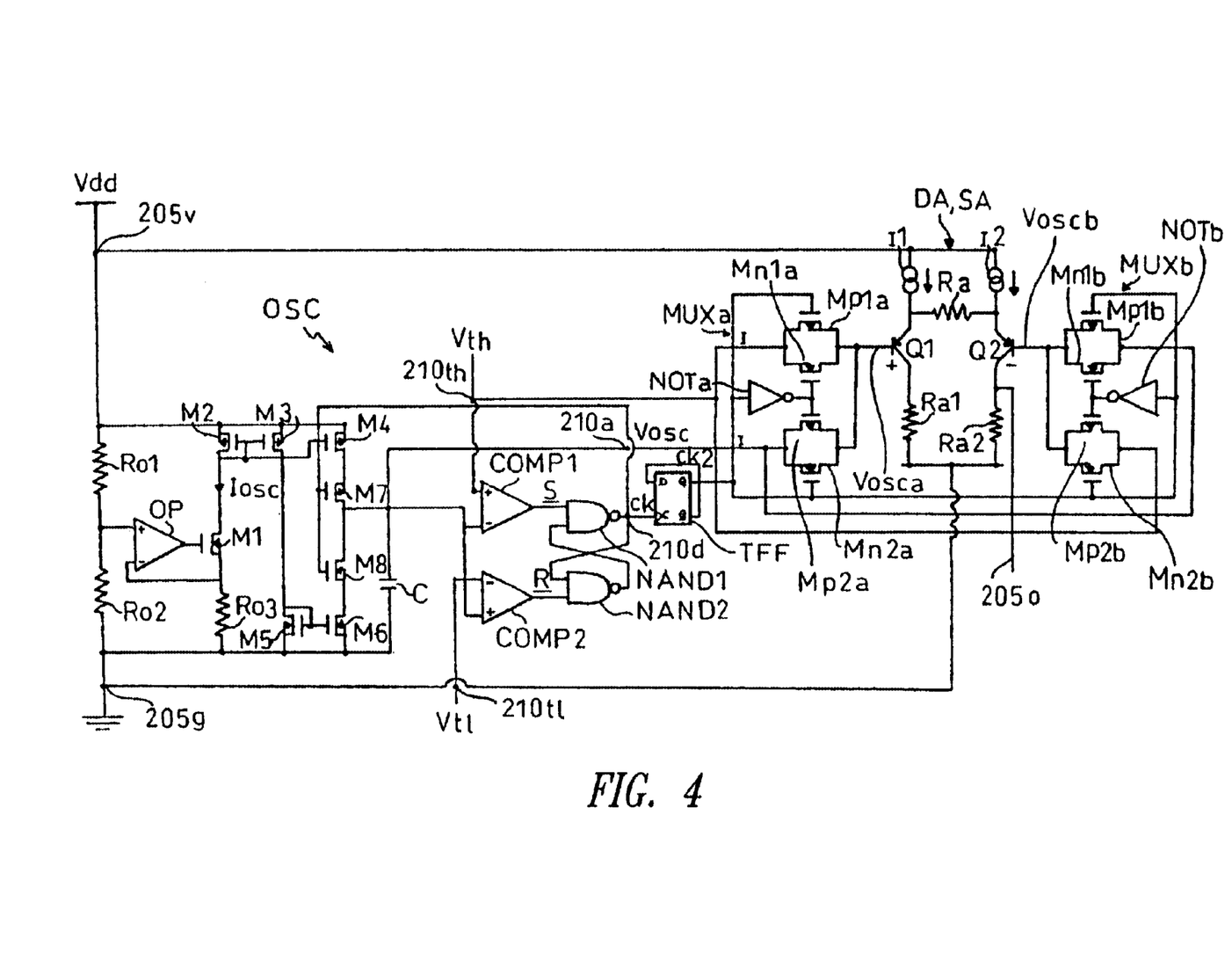
FIG. 4 is a circuit implementation of the wave-shaper device of FIG. 2.

With reference now to FIG. 4, it is shown a preferred circuit implementation of the wave-shaper device. The oscillator OSC includes two resistors Ro1 and Ro2 which are connected in series between the reference terminal 205*g* and the supply terminal 205*v*. An operational amplifier OP has a non-inverting input (+) connected to a node common to the resistors Ro1 ,Ro2 and an inverting input (−) connected to the reference terminal 205*g* through a further resistor Ro3. An nMOS transistor M1 has a gate terminal and a source terminal connected to an output terminal and to the inverting terminal of the operational amplifier OP, respectively.

The oscillator OSC further includes three pMOS transistors M2, M3 and M4; the transistors M2,M3 and M2,M4 form a respective current mirror (referred to the supply terminal 205*v*) having an input branch connected to a drain terminal of the transistor M1. Two nMOS transistors M5 and M6 form a further current mirror (referred to the reference terminal 205*g*) having an input branch connected to an output branch of the current mirror M2,M3. A half-bridge formed by a pMOS transistor M7 and an nMOS transistor M8 is connected between an output branch of the current mirror M2,M4 and an output branch of the current mirror M5,M6. A common drain terminal of the transistors M7,M8 defines the output terminal 210*a* of the oscillator OSC.

A capacitor C is connected between the reference terminal 205*g* and the output terminal 210*a*. The drain terminal of the transistors M7,M8 is also connected to a negative input terminal of a comparator COMP1 (having a positive input terminal connected to the input terminal 210*th*) and to a positive input terminal of a comparator COMP2 (having a negative input terminal connected to the input terminal 210*tl*). An output terminal of the comparator COMP1 and an output terminal of the comparator COMP2 is connected to a negated S input terminal and to a negated R input terminal, respectively, of a latch formed by two NAND logical gates NAND1 and NAND2. An output terminal of the latch NAND1,NAND2 defines the output terminal 210*d* and is connected to a common gate terminal of the transistors M7,M8.

Each multiplexer MUXa,MUXb includes a first transfer gate formed by a pMOS transistor Mp1*a*,Mp1*b* and an NMOS transistor Mn1*a*,Mn1*b* and a second transfer gate formed by a pMOS transistor Mp2*a*,Mp2*b* and an NMOS transistor Mn2*a*,Mn2*b*; each transfer gate is connected between a respective input terminal and the output terminal of the multiplexer MUXa,MUXb. The transistors Mp1*a*, Mp1*b* and Mn2*a*,Mn2*b* are directly controlled by the digital signal Ck/2, while the transistors Mn1*a*,Mn1*b* and Mp2*a*, Mp2*b* are controlled by the digital signal Ck/2 through a respective NOT logical gate NOTa,NOTb.

The differential amplifier and the saturation amplifier consist of a single amplifier DA,SA including two PNP transistors Q1 and Q2. The transistors Q1 and Q2 have a gate terminal which defines the positive input terminal and the negative input terminal of the saturation differential amplifier DA,SA, respectively. A negative feed-back resistor Ra is connected between the emitter terminal of the transistors Q1 and the emitter terminal of the transistors Q2. An output resistor Ra1 (with Ra1=2·Ra) is connected between the reference terminal 205*g* and a collector terminal of the transistor Q1, and an output resistor Ra2 (with Ra2=2·Ra) is connected between the reference terminal 205*g* and a collector terminal of the transistor Q2. A biasing constant current generator I1,I2 is connected between the supply terminal 205*v* and the emitter terminal of the respective transistor Q1,Q2. The collector terminal of the transistor Q2 defines the output terminal 205*o*.

The elements Ro1,Ro2,OP,Ro3,M1 form a constant current generator. Particularly, the voltage on the resistor Ro3 is equal to the voltage at the non inverting input terminal of the operational amplifier OP, so that a current Iosc through the transistor M1 is $$Iosc = \frac{Vdd \cdot Ro2}{(Ro1 + Ro2) \cdot Ro3}$$

The current Iosc is transmitted to the transistor M7 (by means of the current mirror M2,M4) and to the transistor M8 (by means of the current mirrors M2,M3 and M5,M6).

When the digital signal CK has the logic value 0 (0V), the transistor M7 is on (while the transistor M8 is off); the capacitor C is then charged by the current Iosc through the transistor M7. As soon as the voltage on the capacitor C, which defines the analog signal Vosc, reaches the high threshold value Vth, the output terminal of the comparator COMP1 switches to the logic value 0 (while the output terminal of the comparator COMP2 is at the logic value 1); therefore, the signal applied to the input terminal S of the flip-flop TFF is asserted and the digital signal CK takes the logic value 1. The transistor M8 is then switched on (while the transistor M7 is switched off); the capacitor C is then discharged by the current Iosc through the transistor M8. The output terminal of the comparator COMP1 switches back to the logic value 1. As soon as the voltage on the capacitor C reaches the low threshold value Vtl, the output termninal of the comparator COMP2 switches to the logic value 0; therefore, the signal applied to the input terminal R of the flip-flop TFF is asserted and the digital signal CK takes again the logic value 0.

From the formula defining the capacitance C (dV/dt=Iosc/C), it is obtained that the frequency f of the oscillator OSC is $$f = \frac{Iosc}{2 \cdot (Vth - Vtl) \cdot C}$$

When the digital signal Ck/2 has the logic value 0, the transistors Mp1*a* and Mn1*a* are on (while the transistors Mp2*a* and Mn2*a* are off), so that the multiplexer MUXa transfers the high threshold voltage Vth to the output terminal; on the other hand, when the digital signal Ck/2 has the logic value 1, the transistors Mp2*a* and Mn2*a* are on (while the transistors Mp1*a* and Mn1*a* are off), so that the multiplexer MUXa transfers the analog signal Vosc to the output terminal.

Conversely, when the digital signal Ck/2 has the logic value 0, the transistors Mp1*b* and Mn1*b* are on (while the transistors Mp2*b* and Mn2*b* are off), so that the multiplexer MUXb transfers the analog signal Vosc to the output terminal; on the other hand, when the digital signal Ck/2 has the logic value 1, the transistors Mp2*b* and Mn2*b* are on (while the transistors Mp1*b* and Mn1*b* are off), so that the multiplexer MUXb transfers the high threshold voltage Vth to the output terminal.

The analog signal Vout at the collector terminal of the transistor Q2 is a linear function of the difference between the signals Vosca and Voscb, until the analog signal Vout does not reach the saturation value ±Vsat (which can be controlled by varying the current of the generators I1,I2). When the analog signal Vout reaches the saturation value iVsat, the analog signal Vout remains constant (irrespective of any increase in the difference between the signals Vosca and Voscb).

The above described circuit is particularly simple and effective. However, the wave-shaper device of the present invention leads itself to be implemented even with different circuit solutions.

Naturally, in order to satisfy local and specific requirements, a person skilled in the art may apply to the wave-shaper device described above many modifications and alterations all of which, however, are included within the scope of protection of the invention as defined by the following claims.

What is claimed is:

1. A wave-shaper device, comprising:
   an output terminal for providing a periodic first analog signal with a first frequency;
   an oscillator having an output terminal for providing a periodic second analog signal with a second frequency which is a multiple by an even factor of the first frequency, wherein the second analog signal has a triangular shape;
   means for obtaining the first analog signal from the second analog signal comprising frequency dividing means for obtaining a periodic third analog signal from the second analog signal, the third analog signal having a triangular shape and a frequency equal to the first frequency, and clamping means for obtaining the first analog signal from the third analog signal, the first analog signal having a trapezoidal shape.

2. The device according to claim 1, wherein the second frequency is twice the first frequency.

3. The device according to claim 1, wherein the oscillator has a first input terminal and a second input terminal for receiving a low threshold value and a high threshold value for the second analog signal, respectively, the second frequency being a function of the difference between the high threshold value and the low threshold value, and a further output terminal for providing a first digital signal having a frequency equal to the second frequency, the frequency dividing means comprising means for obtaining a second digital signal from the first digital signal, the second digital signal having a frequency equal to the first frequency, a first multiplexer and a second multiplexer controlled by the second digital signal, the first multiplexer transmitting one of the threshold values and the second analog signal when the second digital signal has a first and a second logic value, respectively, and the second multiplexer transmitting the second analog signal and the threshold value when the second digital signal has the first and the second logic value, respectively, and a differential amplifier for obtaining the third analog signal from the signals transmitted by the first and the second multiplexers.

4. The device according to claim 3, wherein the differential amplifier and the clamping means include a single saturation differential amplifier for obtaining the first analog signal from the signals transmitted by the first and the second multiplexers.

5. The device according to claim 4, further comprising a reference terminal, a supply terminal for receiving a regulated supply voltage, a control terminal for receiving a control voltage, and means for providing the low threshold value and the high threshold value as a function of the supply voltage and of the control voltage.

6. A transmitter, comprising:
a reference terminal for providing a periodic first analog signal with a first frequency;
a supply terminal for receiving a power supply voltage;
an oscillator having an output terminal for providing a periodic second analog signal with a second frequency which is multiple by an even factor of the first frequency;
a regulator for obtaining the regulated supply voltage from the power supply voltage; and
a frequency modulator for modulating a current absorbed by the transmitter according to the first analog signal.

7. A control system for air-bags including the transmitter of claim 6, a trigger box for providing the power supply voltage, the trigger box outputting control signals for the air-bags according to the modulated current, and an acceleration sensor supplied by the regulated supply voltage for providing the control voltage as a function of an acceleration detected by the sensor.

8. A method of generating a first periodic analog signal with a first frequency, the method comprising the steps of:
generating a second periodic analog signal with a second frequency which is multiple by an even factor of the first frequency,
obtaining the first analog signal from the third analog signal, utilizing a clamping circuit for obtaining the first analog signal from the third analog signal, and utilizing a frequency converter including a frequency divider for obtaining a third analog signal from the second analog signal, the third analog signal having a frequency equal to the first frequency.

9. A transmitter, comprising:
a supply terminal for receiving a power supply voltage;
a frequency modulator for modulating a current absorbed by the transmitter according to a first analog signal having a first frequency;
an oscillator having a first output terminal for providing a second analog signal with a second frequency that is an even multiple of the first frequency; and
a frequency converter that produces the first analog signal from the second analog signal and includes;
a frequency divider for obtaining a third analog signal from the second analog signal, the third analog signal having a frequency equal to the first frequency; and
a clamping circuit for obtaining the first analog signal from the third analog signal.

10. The transmitter of claim 9, wherein the second frequency is twice the first frequency.

11. The transmitter of claim 9 wherein the first analog signal is trapezoidal and the second and third analog signals are triangular.

12. The transmitter of claim 9, further comprising a voltage divider having a first tap at which a first threshold voltage is produced and a second tap at which a second threshold voltage is produce, wherein the oscillator has a first input terminal coupled to the first tap and a second input terminal coupled to the second tap, the second frequency being a function of a difference between the first threshold voltage and the second threshold voltage.

13. The transmitter of claim 12, wherein the oscillator includes a second output terminal for providing a first digital signal having a frequency equal to the second frequency, the frequency converter including:
a frequency divider that produces a second digital signal from the first digital signal, the second digital signal having a frequency equal to the first frequency;
a first multiplexer controlled by the second digital signal and having a first input coupled to the first tap and a second input coupled to the first output of the oscillator, the first multiplexer outputting the first threshold voltage when the second digital signal has a first logic value and outputting the second analog signal when the second digital signal has a second logic value;
a second multiplexer controlled by the second digital signal and having a first input coupled to the first tap and a second input coupled to the first output of the oscillator, the second multiplexer outputting the second analog signal when the second digital signal has the first logic value and outputting the first threshold voltage when the second digital signal has the second logic value; and
a differential amplifier having first and second inputs coupled to the first and second multiplexers, respectively, the differential amplifier producing the third analog signal based on a difference between the signals output by the first and second multiplexers.

14. The transmitter of claim 13, wherein the differential amplifier and the clamping circuit comprise a single saturation differential amplifier for obtaining the first analog signal from the signals transmitted by the first and the second multiplexers.

15. The transmitter of claim 12, wherein the voltage divider includes a first resistance between a first supply reference terminal and the first tap, a second resistance between the first and second taps, a third resistance between a second supply reference terminal and the second tap, and a fourth resistance between a control voltage terminal and the first tap.

16. The transmitter of claim 12 wherein the voltage divider is connected between first and second supply voltage terminals and a control voltage terminal, the transmitter further comprising:

a frequency modulator for modulating a current absorbed by the transmitter according to the first analog signal;

a trigger box for providing a control signal according to the modulated current; and an acceleration sensor that provides to the control voltage terminal a control voltage as a function of an acceleration detected by the sensor.

* * * * *